United States Patent [19]

Damratroski et al.

[11] 4,169,577

[45] Oct. 2, 1979

[54] IRRIGATION PIPE GATE

[75] Inventors: Harold E. Damratroski, Alda; Ray H. Morton, Grand Island, both of Nebr.

[73] Assignee: Traid Fastener Corporation, Alda, Nebr.

[21] Appl. No.: 827,894

[22] Filed: Aug. 26, 1977

[51] Int. Cl.² .............................................. F16K 3/22
[52] U.S. Cl. .................................................. 251/145
[58] Field of Search ................................ 251/145, 146

[56] References Cited

U.S. PATENT DOCUMENTS

| | | | |
|---|---|---|---|
| 3,327,990 | 6/1967 | Hohnstein | 251/145 |
| 3,539,149 | 11/1970 | Se Breny | 251/145 |
| 3,598,362 | 8/1971 | Heldemann | 251/145 |
| 3,989,224 | 11/1976 | Kroeker | 251/145 |

Primary Examiner—William R. Cline
Attorney, Agent, or Firm—Frost & Jacobs

[57] ABSTRACT

Disclosed are longitudinally slidable gates for the longitudinally extending outlet ports of arcuately walled irrigation pipes, the gates being of the general type wherein a gasketed inner-plate cooperates with and is longitudinally co-movable with an outer cover member slidably disposed at the pipe outside surface. The gate concept disclosed herein includes a boss attached to and extending radially outwardly from the inner-plate and longitudinally guided by the pipe water outlet port, the gate cover member being afforded vertically movable relationship to the inner-plate and resiliently urged theretoward and to the intervening pipe wall with disjointed separable spring means to accommodate the pipe wall given finite-thickness. Preferably, the boss includes a transverse bridge defining a boss longitudinal bore to accommodate therealong an inexpensive, reliable and rugged leaf spring, which might be desireably independently formed of reinforced resinous material. Further, novel inner-plate gaskets are disclosed which provide slidable water-tight seals of unusual reliability and which also compensate for a range of selectable pipe radii and encountered wall irregularity.

13 Claims, 7 Drawing Figures

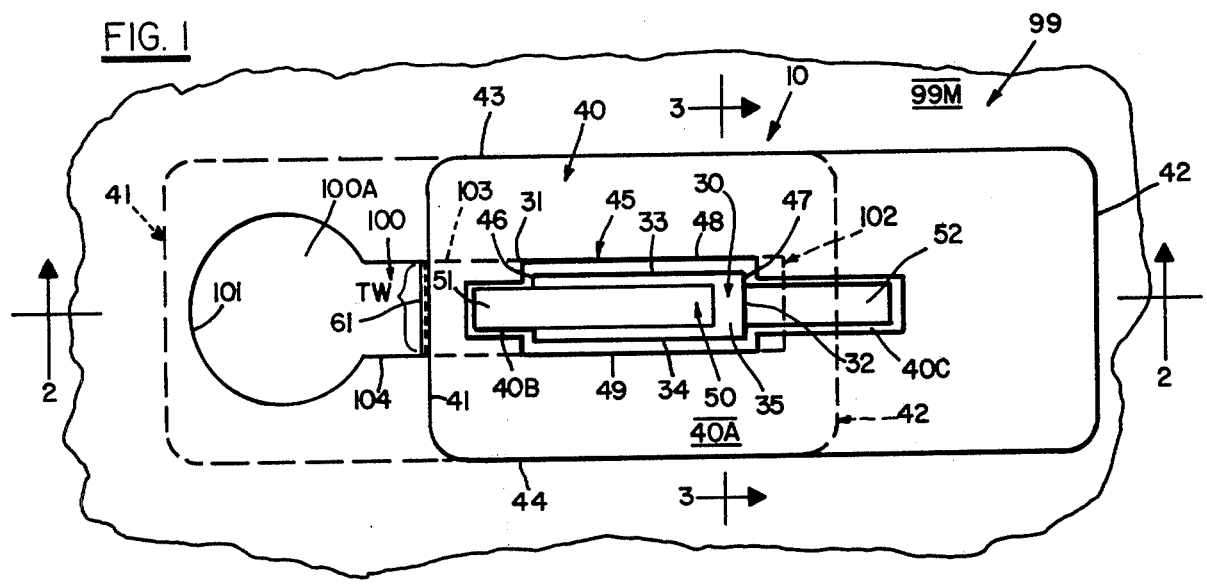

IRRIGATION PIPE GATE

Longitudinally slidably associated valves or gates for the longitudinally extending water outlet ports of circular or other arcuately walled irrigation pipes traditionally comprise a peripherally gasketed inner-plate at the pipe wall inside surface which cooperates with and is longitudinally co-movable with a cover member slidably disposed along the pipe wall outside surface. The prior art teaches various intervening attachment means extending radially outwardly from the inner-plate through the water outlet port and to the cover member to provide longitudinal co-movement. Certain of these prior art intervening attachment means are also intended to compensate for some range of pipe wall thickness and pipe wall deformation. However, such prior art intervening attachment means tend to be expensive, less than satisfactory for the intended purposes, and do not possess the necessary reliability under exigiencies of field use. Prior art gaskets, though intended to provide an efficaceous water-tight seal and to accommodate a range of pipe radii and wall deformation, have proven deficient in several respects.

It is accordingly the general object of the present invention to provide irrigation pipe gates which overcome several of the disadvantages and deficiencies of prior art gate valves. Ancillary objectives include providing an intervening attachment means between inner-plate and cover member which provides an inexpensive, reliable, and rugged non-rotatable and limited vertically movable relationships therebetween, yet which efficaceously resiliently urges them toward the intervening pipe wall and hence adaptable for some range of pipe wall thickness. Among other ancillary objects is providing gaskets which provide an unusually good slidable water-tight seal as the gate is moved longitudinally along the pipe water outlet port, without rolling-up at the outlet port lead-end, and also conformable to pipe wall deformations and irregularities and accommodating a range of pipe diameters.

With the above and other objects and advantages in view, which will become more apparent as this description proceeds, the irrigation pipe gate of the present invention generally comprises; a base member including an inner-plate located radially inwardly the pipe and further including a boss extending upwardly through and guided by the pipe water outlet port; a resilient gasket attachable along the inner-plate periphery and desireably including a special teardrop cross-sectional shape to accommodate a range of pipe size and wall irregularity, functioning as an apt water-tight slidable seal; a cover member in non-rotatable and some vertically movable relationships to the base member upright boss; and spring means physically disjointed and readily separatable from the base and cover members for resiliently urging them toward each other and the intervening pipe wall, the spring means being preferably as an elongated curved leaf spring and amenable to being independently formed of metallic or resinous structural materials.

In the drawing, wherein like characters refer to like parts in the several views, and in which:

FIG. 1 is a top plan view of the preferred embodiment of the longitudinally slidable gate concept of the present invention, shown in operable associated condition at a water outlet port of a circular irrigation pipe. Solid line indicates the gate partially closing the pipe water outlet port, and phantom line indicates the gate fully closing the pipe port;

FIG. 2 is a longitudinally extending sectional elevational view taken along lines 2—2 of FIGS. 1 and 3;

FIG. 6 is a perspective view of a leaf spring component prior to its installation; and FIG. 7 is a sectional elevational view taken along line 7—7 of FIG. 6 to illustrate a reinforced resinous embodiment thereof.

Figure 3:
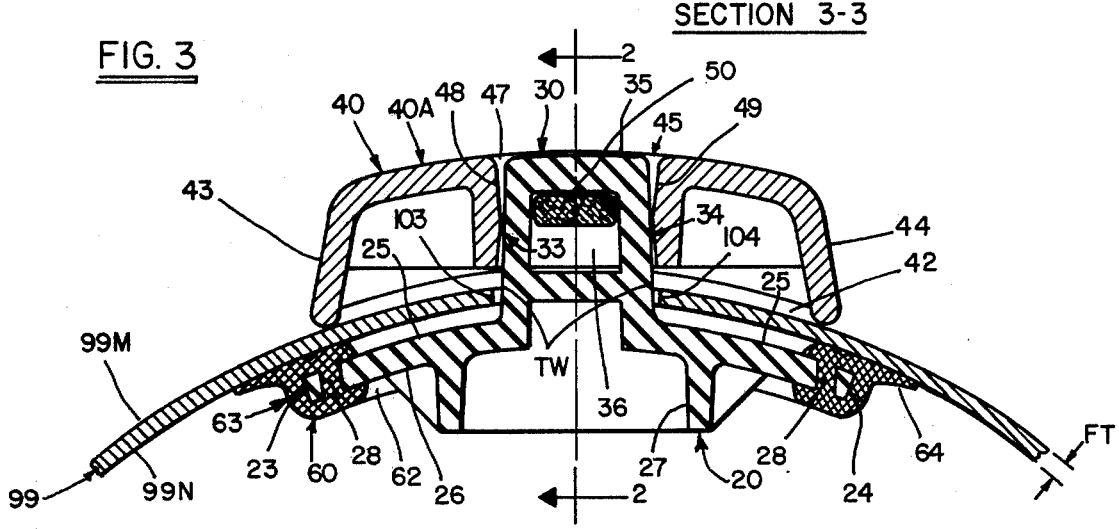
FIG. 3 is a transversely extending sectional elevational view taken along lines 3—3 of FIGS. 1 and 5.

A typical arcuately walled tubular irrigation pipe is indicated in the drawing as 99, with the wall having a finite-thickness "FT" from pipe inside surface 99N to the outside surface 99M thereof. Most commonly, irrigation pipes, e.g., 99, are of circular cross-sectional shape as alluded to in FIGS. 3 and 4 of the drawing. The irrigation pipe outlet port for water is depicted generally as 100 of typical keyhole-shaped configuration including an enlarged leadward part 100A defining the port lead-end 101 and a narrower longitudinally extending trailward part comprising parallel longitudinal edges 103 and 104, spaced apart a transverse-width "TW," and terminating at port trail-end 102.

Gate assembly 10, which is longitudinally slidably associated with irrigation pipe 99 along water outlet port 100, generally comprises: a base member comprising inner-plate 20 and a boss 30 longitudinally guided by port edges 103-104; a water-tight gasket 60 slidably associated along pipe inside surface 99N and adhered to the periphery 21-24 of inner-plate 20; a cover member 40 having its lower periphery 41-44 proximal the pipe outside surface 99M and having a vertical central opening 45 of transverse-width "TW" and thus non-rotatably surrounding boss 30, there being some vertical movement permitted between boss 30 and cover 40, and suitable spring means, such as leaf spring 50, formed independent of the base and cover members and resiliently urging them toward each other and the intervening pipe port 100.

Figure 5:
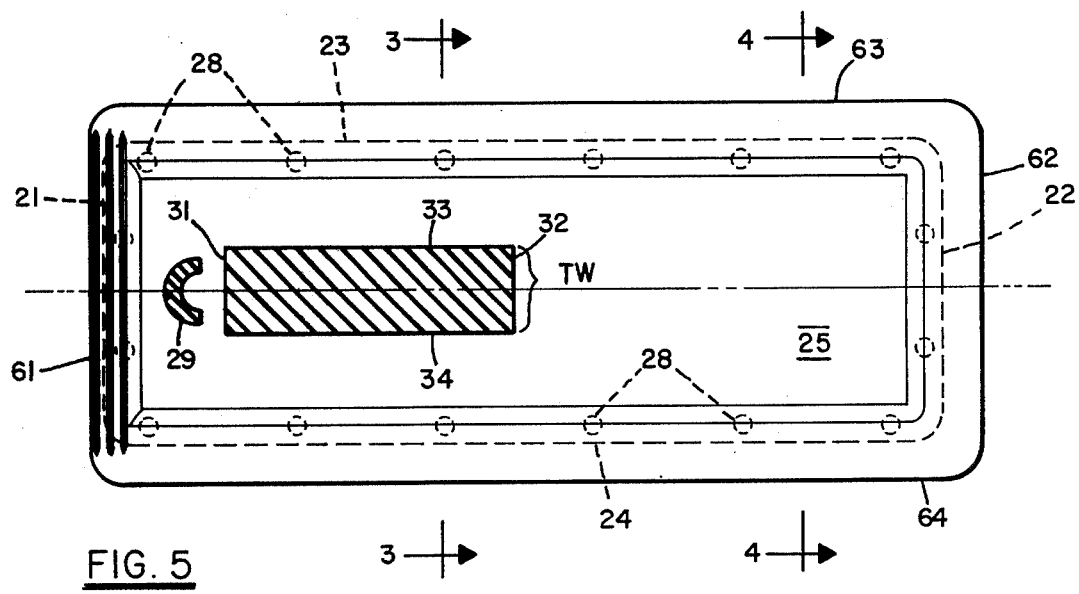
FIG. 5 is a sectional plan view taken along arcuate line 5—5 of FIG. 4.

The inner-plate component 20 of the base member has a relatively large periphery 21-24, such as the substantially rectangular projected shape as seen in FIG. 5, whereby the inner-plate has a longitudinal extent 21-22 and a transverse extent 23-24 exceeding the outlet port longitudinal 101-102 and transverse 100A extents, respectively. Determining the gate's longitudinally fully closed condition, as seen in FIG. 1 (phantom line) and in FIG. 2, a gate striker member, e.g., 29 abuttable against port lead-end 101, is conventionally employed. Upperside 25 of inner-plate 20 is desireably of linearly generated convex configuration to remain substantially parallel to the pipe inside surface 99N. The striker member 29 herein depicted extends integrally upwardly from the inner-plate upper-side 25 adjacent to lead-end 21 and located between the boss 30 and lead-end 21. As herein depicted, the inner-plate 20, the striker 29, and the boss 30 are together desireably formed from a single piece of resinous or other suitable structural material, but separately formed from the cover member (40) and the spring means. Inner-plate 20 might be provided with a plurality of vertical holes 28 spaced along the periphery 21-24 and extending between surfaces 25-26, to aid in the securing of a suitable gasket, e.g., 60, along said inner-plate periphery. Underside ribs 27 are employed to structurally reinforce inner-plate 20.

The boss component 30 of the base member is attached to the inner-plate and located midway longitudinal sides 23-24, boss 30 extending uprightly from upperside 25 and through both pipe port 100 and cover opening 45 to terminate loftily above pipe outside surface 99M. As seen in plan view, FIGS. 1 and 5, boss 30 is of generally rectangular shape including transversely extending ends 31-32 and a pair of longitudinally extending parallel upright panels 33-34 having a transverse spacing of substantially "TW" whereby boss 30 is longitudinally guided by outlet port parallel sides 103-104. Boss 30 from 31 to 32 is provided with a longitudinally extending bore 36 by the existence of transverse bridge portion 35 at the boss upper extremity from panel 33 to panel 34.

Figure 4:
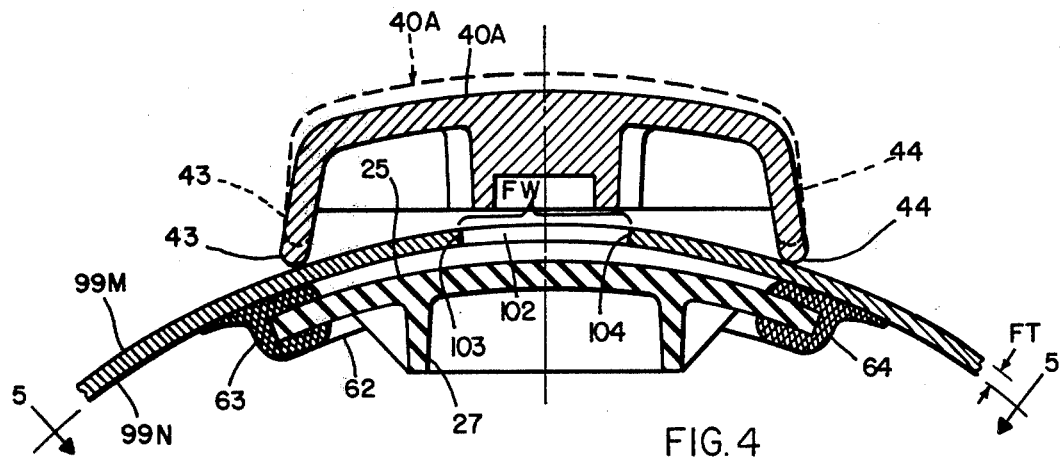
FIG. 4 is a sectional elevational view taken along lines 4—4 of FIGS. 2 and 5.

Cover member 40 as seen in top plan view is of substantially rectangular shape having four upright sides including transversely extending sides 41-42 having concave lower ends and longitudinally extending sides 43-44, the rectangularly annular lower periphery 41-44 this being downwardly conformable to the pipe outside surface 99M. The cover member is provided with a vertically extending opening 45 therethrough of substantially rectangular shape in plan view including transversely extending upright sides 46-47 and a pair of longitudinally extending parallel upright sides 48-49 having a transverse spacing of substantially "TW," whereby cover 40 non-rotatably surrounds boss 30. However, as indicated in FIG. 4 phantom line, cover member 40 is vertically movable with respect to boss 30, though inhibited to some degree when the spring means, e.g., 50, is installed. In this fashion, when the separate spring means is in removably installed condition along boss bore 36 and bearing against the cover ramp-like depressions 40B and 40C, the gate from gasket 60 to cover 40 can conform to some variation in the pipe wall finite thickness "FT" including deformations therein. These two ramp-like depressions 40B and 40C commence below cover top surface 40A at central opening 45 and respectively extend longitudinally and upwardly therefrom as best seen in FIGS. 1 and 2.

Suitable spring means, physically disjointed and separable from the cover (40) and base members, are employed for resiliently urging the cover 40 and inner-plate 20 toward the outward surface 99M and the inward surface 99N, respectively, of the intervening finite-thickness ("FT") irrigation pipe. In this regard, the spring means might actuatably extend from cover 40 to the base member boss portion 30. Moreover, the spring means preferably takes the form of a longitudinally extending and elongated leaf spring, e.g., 50, extending throughout the boss bore 36 and terminally bearing against cover member 40. Specifically, a medial portion of curved leaf spring 50 bears upwardly against boss bridge 35 with the spring lead-length 51 and trail-length 52 bearing downwardly against ramps 40B and 40C, respectively. Structural material for the separate and removably installable leaf spring ordinarily differs from that of the cover 40 and the base member (20,30). For example, suitable leaf springs might be formed of metallic or resinous structural materials, and in the latter case can be internally structurally reinforced, e.g., with fiberglass, etc., as alluded to in FIG. 7. After extended periods of use, a fatigued leaf spring might be readily removed, inverted, and re-installed, such re-installed condition thereof having resiliently characteristics comparable to that of a freshly fabricated leaf spring.

There is a suitable water-tight gasket, e.g., 60, slidably associated along the pipe inward surface 99N and annularly extending and attached along the periphery 21-24 of inner-plate 20. The gasket, as a relatively more compressive resinous material compared to that of the inner-plate, is preferably continously adhered to both surfaces 25 and 26 of inner-plate 20 so as to enhance its water-tight condition relative thereto and to maintain the inner-plate periphery 21-24 a small distance away from the pipe inside surface 99N. Additional anchoring strength of gasket 60 to inner-plate 20 is afforded by moldable permeation of the gasket resinous material through the inner-plate several vertical holes 28. The gasket leadward quadrant 61 along its upperside is desireably provided with transversely extending ridges to prevent roll-up of the gasket as the gate 10 is being longitudinally slidably opened and closed at the water outlet port lead-end 101. The rearward (62) and the longitudinals (63,64) three gasket quadrants are in cross-sectional shape feathered outwardly and upwardly from the periphery of the gasket to accommodate a range of radii for the arcuate irrigation pipe, and thus, one size of the gate assembly 10 is adaptable for more than one cross-sectional size irrigation pipe.

From the foregoing, the construction and operation of the irrigation pipe gate will be readily understood and further explanation is believed to be unncessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed is as follows:

1. A longitudinally slidable irrigation pipe gate for opening and closing a longitudinally elongated outlet port in an irrigation pipe having a wall of given finite thickness, said port including a transversely extending lead-end and a trail-end and at least a portion of the outlet port length being of regular transverse width, said pipe gate comprising:

A. a base member comprising an inner-plate for abutting against the inner surface of the pipe and of longitudinal and transverse extents exceeding those of the outlet port, and a boss attached to the inner-plate medial portion of the base member and dimensioned to extend upwardly through the pipe port, said boss being of regular transverse width at the pipe port, said boss being provided with a transversely extending bridge defining a longitudinally extending bore for said boss;

B. a resilient annular gasket attached along the periphery of the inner-plate for providing a water-tight slidable seal between the inner-plate and the inner surface of the pipe;

C. a cover member having longitudinally extending edges slidably abutting the outside surface of the pipe and having a transverse opening for receiving and non-rotatably surrounding the boss, said cover member having a top-surface including ramp-like depressions extending in both longitudinal directions from the central opening thereof, whereby there is relative vertical movement between the inner-plate and the cover member to accommodate the given finite-thickness of the pipe wall; and D. spring means for connecting the cover member and the inner-plate and resiliently urging them toward the outside surface and the inside surface, respectively, of the intervening finite-thickness pipe wall; said spring means being readily insertable for assembly of the pipe gate and readily removable for disassembly thereof, said spring means comprising a longitudinally extending elongated leaf spring, said leaf spring extending along the boss longitudinal bore and being physically disjointed from the base and cover members, said leaf spring including a lead-length and a trail-length compressed downwardly against the respective ramp-like depressions by virtue of the boss bridge bearing downwardly against the leaf spring medial portion whereby said leaf spring resiliently urges the base and cover members toward each other as a slidably associated irrigation pipe gate;

the pipe gate having a closed forward position wherein the base member and gasket completely cover the periphery of the outlet port and an open rearward position wherein a portion of said outlet port is not covered by the base member and gasket.

2. The pipe gate of claim 1 wherein the leaf spring is of elongated curved configuration and constructed wholly of fiberglass-reinforced resin; and wherein the structural material for the base and cover members differ from that of the leaf spring.

3. The pipe gate of claim 1 wherein the leaf spring medial portion is provided with an upwardly extending tab abuttable against the boss transverse bridge and facilitating installation and removal of said leaf spring.

4. The pipe gate of claim 3 wherein the entire leaf spring is constructed wholly of a fiberglass-reinforced resin, which resinous material differs from the structural materials used for the base and cover members.

5. The pipe gate of claim 1 wherein the leaf spring is longitudinally installable and removable.

6. The pipe gate of claim 5 wherein the leaf spring is provided of a resinous material constructed independently of the base and cover members.

7. The pipe gate of claim 1 wherein the rearward and the longitudinal three quadrants of the gasket are in cross-sectional shape feathered outwardly and upwardly from the periphery of the gasket to accommodate a range of diameters and wall irregularities of the irrigation pipe.

8. The pipe gate of claim 7 wherein the gasket is of a resinous structural material adhered to the upper and lower surfaces of the inner-plate, there being spaced perforations alongside the inner-plate periphery and respectively extending through the upper and lower surface of the inner-plate, the gasket structural material extending through said inner-plate perforations.

9. The pipe gate of claim 1 wherein the resiliently compressive gasket is adhered to the upper and lower surfaces of the inner-plate along its entire periphery thereby also maintaining the inner-plate periphery a small distance away from the irrigation pipe inside surface.

10. The pipe gate of claim 9 wherein the rearward and the longitudinal three gasket quadrants are of cross-sectional shape feathered outwardly and upwardly from the periphery of the gasket to accommodate a range of radii and wall irregularities of the irrigation pipe.

11. The pipe gate of claim 1 wherein the gasket leadward quadrant is provided with transversely extending ridges to prevent roll-up of the gasket as the gate is being opened and closed at the water outlet port lead-end.

12. The pipe gate of claim 1 wherein the inner-plate is provided with a striker forward of the boss which striker extends upwardly through the outlet port so as to abut the port lead-end when the pipe gate is in its closed position and prevents further forward movement of the pipe gate.

13. The pipe gate of claim 1 wherein said bridge is located on or substantially adjacent the transverse and longitudinal centers of the pipe gate.

* * * * *